US012737208B2

(12) United States Patent
Jain et al.

(10) Patent No.: US 12,737,208 B2
(45) Date of Patent: Sep. 15, 2026

(54) VIRTUAL GRAPHICS PROCESSING UNIT SCHEDULING BASED PREEMPTION OVERHEAD

(71) Applicant: NVIDIA Corporation, Santa Clara, CA (US)

(72) Inventors: Vikas Jain, Pune (IN); Somdutta Roy, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 810 days.

(21) Appl. No.: 17/683,187

(22) Filed: Feb. 28, 2022

(65) Prior Publication Data

US 2023/0273806 A1 Aug. 31, 2023

(51) Int. Cl.

*G06F 9/455* (2018.01)
*G06F 9/38* (2018.01)
*G06F 9/48* (2006.01)

(52) U.S. Cl.

CPC ........ *G06F 9/45558* (2013.01); *G06F 9/3877* (2013.01); *G06F 9/4881* (2013.01);
(Continued)

(58) Field of Classification Search

CPC .. G06F 9/45558; G06F 9/3877; G06F 9/4881; G06F 2009/4557; G06F 2009/45583; G06F 9/461; G06F 9/485

See application file for complete search history.

(56) References Cited

U.S. PATENT DOCUMENTS 6,813,760 B1 * 11/2004 Fitzel .................. G06F 11/3476 718/104
7,165,252 B1 * 1/2007 Xu ........................ G06F 9/4887 718/100

(Continued)

*Primary Examiner* — Aimee Li
*Assistant Examiner* — Harrison Li
(74) *Attorney, Agent, or Firm* — Lowenstein Sandler LLP

(57) ABSTRACT

A plurality of virtual processing units associated with a physical processing unit is identified. Each of the plurality of virtual processing units is associated with a virtual machine of a plurality of virtual machines that run on respective virtual processing units in round-robin order using respective assigned execution time periods. A first overhead time value associated with running of the first virtual machine on a first virtual processing unit of the plurality of virtual processing units is obtained for a first virtual machine of the plurality of virtual machines. A second overhead time value associated with running of the second virtual machine on a second virtual processing unit of the plurality of virtual processing units is obtained for a second virtual machine of the plurality of virtual machines. The first overhead time value associated with the running of the first virtual machine and the second overhead time value associated with running of the second virtual machine are compared. Whether the second overhead time value associated with the running of the second virtual machine satisfies a compensation threshold criterion is determined based on the comparing. Responsive to determining that the second overhead time value associated with the running of the second virtual machine satisfies the compensation threshold criterion, causing the running of the second virtual machine to be repeated prior to running any other of the plurality of virtual machines.

18 Claims, 6 Drawing Sheets

(52) U.S. Cl.
CPC ................ *G06F 2009/4557* (2013.01); *G06F 2009/45583* (2013.01)

(56) References Cited

U.S. PATENT DOCUMENTS

2005/0132364 A1* 6/2005 Tewari ................ G06F 9/45558
718/1
2021/0064405 A1* 3/2021 Ashkar ............... G06F 9/45558
718/1
2022/0086103 A1* 3/2022 Lu ............................ G06N 3/04
709/226

* cited by examiner

Identify a plurality of virtual processing units associated with a physical processing unit, wherein each of the plurality of virtual processing units is associated with a virtual machine of a plurality of virtual machines that run on respective virtual processing units in round robin order using respective assigned execution time periods. 210

Obtain, for a first virtual machine of the plurality of virtual machines, a first overhead time value associated with running of the first virtual machine on a first virtual processing unit of the plurality of virtual processing units. 220

Obtain, for a second virtual machine of the plurality of virtual machines, a second overhead time value associated with running of the second virtual machine on a second virtual processing unit of the plurality of virtual processing units. 230

Compare the first overhead time value associated with the running of the first virtual machine and the second overhead time value associated with running of the second virtual machine. 240

Determine, based on the comparing, whether the second overhead time value associated with the running of the second virtual machine satisfies a compensation threshold criterion. 250

Responsive to determining that the second overhead time value associated with the running of the second virtual machine satisfies the compensation threshold criterion, cause the running of the second virtual machine to be repeated prior to running any other of the plurality of virtual machines. 260

FIG. 2

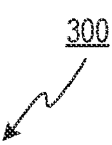

For each run of a first virtual machine of a plurality of virtual machines on a first virtual processing unit of a plurality of virtual processing units associated with a physical processing unit for an assigned execution time, add an overhead time value associated with a respective run to a first total overhead time value. 310

For each run of a second virtual machine of the plurality of virtual machines on a second virtual processing unit of the plurality of virtual processing units associated with the physical processing unit for the assigned execution time, add an overhead time value associated with a respective run to a second total overhead time value. 320

Before a run of a next virtual machine, determine that the first total overhead time value is greater than the second total overhead time value and a difference between the first total overhead time value and the second total overhead time value. 330

Responsive to determining that the difference exceeds the assigned execution time, cause a run of the first virtual machine to be repeated before running any other virtual machine of the plurality of virtual machines. 340

FIG. 3

VIRTUAL GRAPHICS PROCESSING UNIT SCHEDULING BASED PREEMPTION OVERHEAD

TECHNICAL FIELD

At least one embodiment pertains to solutions for compensation for virtual graphics processing unit (vGPU) scheduling. For example, at least one embodiment pertains to scheduling a vGPU of a virtual machine executing on a graphical processing unit (GPU) based on workload overhead according to various novel techniques described herein.

BACKGROUND

Para-virtualization allows guest operating systems (OSes) executed using virtual machines (VMs) to share resources and successfully collaborate rather than emulate an entire hardware environment. In particular, para-virtualization presents a similar software interface to VMs, yet not identical to the underlying physical hardware-software interface. Typically, para-virtualization is implemented as a graphics virtualization software platform that provides VMs access to the physical hardware. The software enables multiple VMs to have simultaneous, direct access to single physical hardware, using the same drivers deployed on non-virtualized operating systems. Accordingly, the software provides VMs with unparalleled performance and application compatibility, together with the cost-effectiveness and scalability brought about by sharing physical hardware among multiple workloads.

BRIEF DESCRIPTION OF DRAWINGS

FIG. 2 is a flow diagram of a method of facilitating vGPU scheduling based on preemption overhead, in accordance with at least one embodiment;

FIG. 3 is a flow diagram of yet another method of facilitating vGPU scheduling based on preemption overhead, in accordance with at least one embodiment;

DETAILED DESCRIPTION

Figure 1:
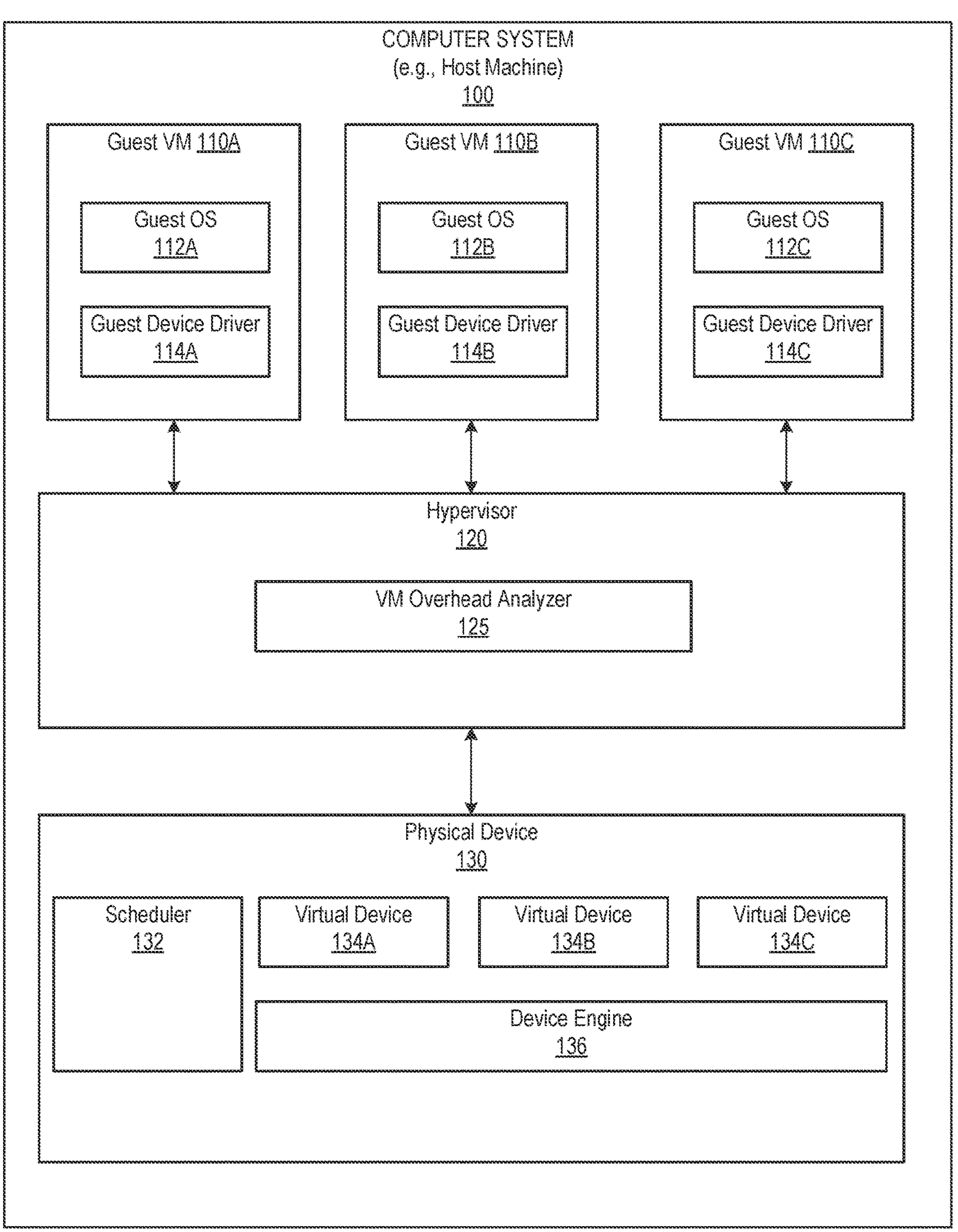
FIG. 1 illustrates an example computing system for compensation for virtual graphics process unit scheduling based on preemption overhead, in accordance with at least one embodiment.

Typically, in a para-virtualized computing environment, computer architecture resources and functionality are shared between multiple virtual machines. In particular, computer systems can include graphics processing units (GPUs) that provide, during para-virtualization, resources to a virtual graphics processing unit (vGPU) of the virtual machine. Accordingly, due to multiple vGPUs each associated with a virtual machine (VM) sharing resource of a single GPU, the host (e.g., a host operating system or a hypervisor) sets predetermined time periods (e.g., time slices) in which resources (e.g., graphics (three-dimensional), video decoding, video encoding, etc.) of the GPU are provided to each vGPU in a round-robin fashion for discrete durations of time (time slices). In particular, the vGPUs are scheduled to run (e.g., execute computing tasks) in series of slices while other vGPUs are waiting. During a scheduled allocation of a current vGPU, the current vGPU has exclusive use of the GPU's resources.

In order to balance performance across each vGPU, each vGPU is allowed to use the GPU for a predetermined time period (e.g., time slice). Thus, during each time slice, each VM is provided the predetermined time period (e.g., 2 ms) to run any authorized commands (e.g., use of the GPU resources). However, switching between VMs every time slice results in additional time (e.g., overhead) due to context saves, context restores, and/or GPU drain. For instance, before running a subsequent VM, the GPU should be drained of any commands from the previously running VM, resulting in the previous VM running on its vGPU for the time period that includes both the time slice and the overhead time caused by the GPU drain. After the GPU drain, the VM is preempted, causing a GPU context (e.g., state) save and GPU context restore for the subsequent VM, which leads to additional overhead time on top of the overhead time caused by the GPU drain. As a result, due to the additional overhead time caused by GPU context save and restore and GPU drain, each scheduled VM may run on its vGPU longer than the predetermined time period (e.g., allotted time slice) provided exclusively to a respective VM.

According to some existing solutions, a VM that runs on the vGPU longer than the predetermined time period provided (e.g., allotted time slice) is penalized by preventing the VM from running during its next designated time slice, thereby resulting in compensation to other VMs that may be idle or have lesser workloads. Currently, penalization of the VM is based on a total time spent by the VM running on the vGPU (e.g., the predetermined time period associated with the time slice plus any additional time associated with the context save and restore and GPU drain) compared to the total time spent by other VMs running on respective vGPUs. For example, some existing solutions cause a VM to skip its next turn to run on a vGPU if the difference between the total time of its use of the GPU resources, as compared to the total time spent by other VMs, exceeds the predetermined time period associated with the time slice. This, however, reduces the execution time of the VM with a heavier workload, which may be detrimental to performance. In addition, according to this approach, the VM with a heavy workload would need more cycles to finish its workload, thereby further increasing the resulting overhead time.

Aspects of the present disclosure address the above and other deficiencies by providing techniques and methods for allocating an extra time slice to a VM with a larger workload out of turn to compensate the VM with higher overhead instead of the VMs with lower overhead. In at least one embodiment, a total overhead time of a VM is determined based on an overhead time associated with each run (e.g., execution session or time slice) of the VM using the vGPU. In response to determining that the total overhead time of the VM exceeds the predetermined time period (e.g., time slice), one or more processing tasks or computations corresponding to the VM are executed again via the vGPU before processing or computing tasks from a subsequent VM are executed via a respective vGPU (i.e., the vGPU of the VM with the total overhead exceeding the predetermined time period is scheduled to execute before the vGPU of the next VM in the series of vGPUs scheduled for execution).

Accordingly, aspects of the present disclosure allow the VM with the most overhead to run on the vGPU in multiple cycles back to back, thereby improving performance and reducing overhead (e.g., a time associated with context saves and restores and/or GPU drains) resulting from frequent switching of VMs with larger workloads.

It should be noted that graphics processing units (GPUs) and virtual graphics processing units (vGPUs) used with reference to para-virtualization are used herein for illustration only. Aspects of the present disclosure can be similarly applied to any other physical hardware shared between multiple virtual machines.

FIG. 1 depicts an illustrative architecture of elements of a computer system 100, in accordance with an embodiment of the present disclosure. A computer system 100 may be a server, a data center, a system on a chip (SoC), a desktop computer, a laptop computer, a mobile computing device, a video game console, a cloud computing environment, and/or any other computer system. In at least one embodiment, computer system 100 may include, without limitation, one or more hardware devices 130 representing one or more graphical processing units (GPUs), central processing units (CPUs), and/or any other processors. In embodiments, computer system 100 may be components of a device such as a video game console, a mobile phone, an autonomous vehicle, a non-autonomous vehicle, a video surveillance system, a laptop computer, a desktop computer, a quality analysis (QA) inspection system, or other systems. In the example shown in FIG. 1, computing device 100 may include virtual machines 110A-C, hypervisor 120, and hardware device(s) 130.

Virtual machines 110A-C may execute guest executable code that uses an underlying emulation of resources (e.g., device engine 136) of the hardware device 130. The guest executable code may include a guest operating system, guest applications, guest device drivers, etc. Each virtual machine 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating system(s) 112A-C that manage guest memory and access virtual device(s) 134A-C via guest device driver(s) 114A-C, respectively. Hardware device 130 may provide hardware resources and functionality for performing tasks. Hardware device 130 may include one or more graphics processing units (GPUs), central processing units (CPUs), other computing devices, or a combination thereof. One or more hardware device 130 may be split up into multiple separate devices or consolidated into one or more hardware devices. Some of the hardware devices shown may be absent from hardware device 130 and may be partially or completely emulated by executable code.

Resources of a hardware device 130 are provisioned to each virtual machine 110A-C running on the host machine. Provisioning the hardware device 130 resources may include associating one or more virtual device(s) 134A-C with each virtual machine 110A-C. Virtual device(s) 134A-C may be provisioned by a core of the hardware device 130 or a number of time slots reserved from one or more cores of the hardware device 130. Each virtual device 134A-C may be implemented by a corresponding execution thread scheduled to run on hardware device 130. For example, virtual devices 134A-C may be vGPUs that each use resources of the GPU to execute computer graphics and/or image processing commands of a respective virtual machine 110A-C. Hypervisor 120 may also be known as a virtual machine monitor (VMM) that provides virtual machines 110A-C with access to one or more features of the underlying hardware device 130 via virtual devices 134A-C. Additionally, hypervisor 120 may manage the execution of virtual machines 110A-C on a host machine. In the example shown, hypervisor 120 may run directly on the hardware of computer system 100 (e.g., bare-metal hypervisor). In other examples, hypervisor 120 may run on or within a host operating system (not shown).

In some embodiments, the computer system 100 includes a virtual machine (VM) overhead analyzer 125 executed by one or more processors 120. The VM overhead analyzer 125 manages the scheduling of virtual device(s) 134A-C, via a scheduler 132 of the hardware device 130, to access device engine 136 (e.g., resources) of the hardware device 130.

In some embodiments, each virtual device 134A-C is assigned a predetermined time slice (e.g., 2 ms) to run (e.g., access device engine 136 of the physical device 130) the VM 110A-C using resources of the physical device 130. Accordingly, a virtual device 134A-C of each VM 110A-C is ran on the physical device 130 in a round-robin fashion for exactly the assigned predetermined time slice. In some embodiments, each run of virtual device 134A-C of VM 110A-C may be associated with overhead resulting from additional time required to switch from the currently running virtual device 134A-C to a virtual device 134A-C scheduled to run next. The overhead time may be caused, for example, by context switching and physical device drain. Context switching can refer to a process of storing the state of a virtual device (e.g., context save) and using the stored state to restore the virtual device and resume its execution (e.g., context restore). Physical device drain can refer to draining resources (e.g., FrontEnd engine of a GPU and/or other hardware) within the physical device of any commands and/or operations associated with the previously running virtual device 134A-C prior to running a subsequent virtual device 134A-C.

The VM overhead analyzer 125, after each execution of a virtual device 134A-C on the device engine 136 of the physical device 130 for the VM 110A-C, determines an overhead time associated with the execution of each virtual device 134A-C on the device engine 136 of the physical device for the VM 110A-C. The VM overhead analyzer 125 maintains, for each virtual device 134A-C, a running summation of the total overhead time accumulated for the respective virtual device 134A-C. Before scheduling the next virtual device 134A-C (while the current virtual device 134A-C is running, is about to start running or is finishing its run), the VM overhead analyzer 125 identifies, among the virtual device(s) 134A-C, a virtual device having the largest running summation of the total overhead time.

If the identified virtual device of the virtual device(s) 134A-C having the largest running summation of the total overhead time (e.g., a virtual machine with the largest workload) is the current virtual device 134A-C, the VM overhead analyzer 125 determines a difference between the largest running summation of the total overhead time (the running summation of the current virtual device 134A-C) and each of the running summations of the total overhead times associated with the remaining virtual devices of the virtual device(s) 134A-C. If the VM overhead analyzer 125 determines that a difference between the running summation of the total overhead time of the current virtual device of the virtual device(s) 134A-C and any of the running summations of the total overhead times associated with the remaining virtual devices of the virtual device(s) 134A-C exceeds the predetermined time slice, the VM overhead analyzer 125 causes the scheduler 132 to schedule the current virtual device 134A-C for an extra run (right after the current run) on the device engine 136 of the physical device 130.

Depending on the embodiment, upon allocating an extra run to the current virtual device 134A-C, the VM overhead analyzer 125 resets the running summation of the total overhead time associated with each of the virtual device(s) 134A-C to zero. In some embodiments, the VM overhead analyzer 125 may continue to maintain, for each virtual device 134A-C, the running summation of the total overhead time by the respective virtual device 134A-C.

FIG. 2 is a flow diagram of a method 200 of facilitating vGPU scheduling based on preemption overhead, in accordance with at least one embodiment. FIG. 3 is a flow diagram of yet another method 300 of facilitating vGPU scheduling based on preemption overhead, in accordance with at least one embodiment.

Methods 200 and 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 or 300 is performed by the VM overhead analyzer 125 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

Referring to FIG. 2, at block 210, the processing logic identifies a plurality of virtual processing units associated with a physical processing unit, wherein each of the plurality of virtual processing units is associated with a virtual machine of a plurality of virtual machines that run (e.g., execute) on respective virtual processing units in round-robin order using respective assigned execution time periods (allocated discrete time slices). In at least one embodiment, the physical processing unit is a physical graphics processing unit (GPU), and each of the plurality of virtual processing units is a virtual graphics processing unit (vGPU).

At block 220, the processing logic obtains, for a first virtual machine of the plurality of virtual machines, a first overhead time value associated with running (e.g., executing one or more computing tasks of the first virtual machine) the first virtual machine on a first virtual processing unit of the plurality of virtual processing units. The first overhead time value may include one or more of a time period of context save, context restore, and/or physical processing unit drain associated with the first virtual machine. As previously described, context switching refers to a process of storing the state of a virtual device (e.g., context save) so that the virtual device can be restored and resume execution (e.g., context restore). The physical processing unit drain refers to draining the resources and/or engines of the physical processing unit that were used by a previously running virtual machine to start running a subsequent virtual machine. Depending on the embodiment, the first overhead time value may be a running summation of the total overhead time accumulated for the first virtual machine.

At block 230, the processing logic obtains, for a second virtual machine of the plurality of virtual machines, a second overhead time value associated with running (e.g., executing one or more computing tasks of the second virtual machine) of the second virtual machine on a second virtual processing unit of the plurality of virtual processing units. The second overhead time value may include one or more of a time period of context save, context restore, and/or physical processing unit drain associated with the second virtual machine. Depending on the embodiment, the second overhead time value may be a running summation of the total overhead time accumulated for the second virtual machine.

At block 240, the processing logic compares the first overhead time value associated with executing computing tasks during a time slice allocated to the first virtual machine and the second overhead time value associated with executing computing tasks during a time slice allocated to the second virtual machine. At block 250, the processing logic determines, based on the comparison, whether the second overhead time value associated with the time slice allocated to the second virtual machine satisfies a compensation threshold criterion. In some embodiments, the processing logic makes this determination when the second virtual machine is about to start its scheduled run, during its scheduled run, or is about to finish its scheduled run. Determining, based on the comparing, whether the second overhead time value associated with the executing computing tasks during a time slice allocated to the second virtual machine satisfies the compensation threshold criterion may involve determining whether a difference between the second overhead time value and the first overhead time value is greater than a respective assigned execution time period (e.g., assigned time slice) of the second virtual machine.

As previously described, in some embodiments, the processing logic can identify the largest between the first overhead time value and the second overhead time value. If the largest overhead time value is the second overhead time value of the second virtual machine (the virtual machine that is about to start its scheduled run or is currently running or is finishing its scheduled run), the processing logic can determine a difference between the second overhead time value and the first overhead time value. The processing logic can then compare the difference between the he second overhead time value and the first overhead time value with the respective assigned execution time period (e.g., the time slice of 2 ms).

At block 260, responsive to determining that the second overhead time value associated with the running of the second virtual machine satisfies the compensation threshold criterion, the processing logic can cause the allocation of an additional discrete time slice to the second virtual machine before running any other of the plurality of virtual machines. The compensation threshold criterion can be considered satisfied if the difference exceeds the respective assigned execution time period (e.g., the time slice of 2 ms).

Upon causing the allocation of an additional discrete time slice to the second virtual machine, the processing logic can set the second overhead time value to zero. Depending on the embodiment, the processing logic can set the first overhead time value to zero and the second overhead time value to zero.

In some embodiments, responsive to determining that the second virtual machine does not satisfy the compensation threshold criterion, the processing logic causes the running of another virtual machine after the running of the second virtual machine in accordance with the round-robin order (e.g., runs the virtual machine originally scheduled to run after the second virtual machine). Accordingly, the processing logic obtains a third overhead time value associated with the recent running of the second virtual machine. Upon a next run of the first virtual machine on the first virtual processing unit, the processing logic obtains a fourth overhead time value associated with the next run of the first virtual machine. The processing logic calculates, for the first virtual machine, a total overhead time value based on a sum of the first overhead time value and the fourth overhead time value and calculates, for the second virtual machine, a total overhead time value based on a sum of the second overhead time value and the third overhead time value.

As previously described, the processing logic can maintain a running summation of a total overhead time associated with the first virtual machine (e.g., the sum of the first overhead time value and fourth overhead time value) and a running summation of a total overhead time associated with the second virtual machine value (e.g., sum of the second overhead time value and third overhead time value). The processing logic can compare the total overhead time value of the first virtual machine and the total overhead time value of the second virtual machine. As previously described, if the current virtual machine is the first virtual machine and the processing logic determines that the total overhead time value of the first virtual machine is the largest compared to the total overhead time values of the other virtual machines, the processing logic can determine a difference between the total overhead time value of the first virtual machine and each of the other total overhead time values (e.g., the total overhead time value of the second virtual machine).

The processing logic can then determine, based on the comparing, whether the total overhead time value of the first virtual machine satisfies the compensation threshold criterion. For example, the processing logic can determine whether the total overhead time value of the first virtual machine is greater than the total overhead time value of the second virtual machine, and if so, whether the difference satisfies the compensation threshold criterion. The compensation threshold criterion can be considered satisfied if the difference exceeds the respective assigned execution time period (e.g., the time slice of 2 ms). Responsive to determining that the total overhead time value of the first virtual machine satisfies the compensation threshold criterion, the processing logic can cause the next run of the first virtual machine to be repeated before running any other of the plurality of virtual machines.

Referring to FIG. 3, at block 310, for each run of a first virtual machine of a plurality of virtual machines on a first virtual processing unit of a plurality of virtual processing units associated with a physical processing unit for an assigned execution time, the processing logic adds an overhead time value associated with a respective run to a first total overhead time value. As previously described, the processing logic maintains a running summation of the overhead time value accumulated by the first virtual machine associated with each run to obtain the first total overhead time value.

At block 320, for each run (e.g., allocated time slice) of a second virtual machine of the plurality of virtual machines on a second virtual processing unit of the plurality of virtual processing units associated with the physical processing unit for the assigned execution time, the processing logic adds an overhead time value associated with a respective run to a second total overhead time value. As previously described, the processing logic maintains a running summation of the overhead time value accumulated by the second virtual machine associated with each run to obtain the second total overhead time value.

The overhead time value may include, in one or more embodiments, a time period of context save, context restore, and/or GPU drain. As previously described, context switching refers to a process of storing the state of a virtual device (e.g., context save) so that the virtual device can be restored and resume execution (e.g., context restore). The physical processing unit drain refers to draining the resources and/or engines of the physical processing unit of a previously running virtual machine to run a subsequent virtual machine. The physical processing unit can be a physical graphics processing unit (GPU), and the plurality of virtual processing units can be a plurality of virtual graphics processing unit (vGPU).

At block 330, before a run (allocated time slice) of a next virtual machine (e.g., while the first virtual machine is running, is about to start running or is finishing its run), the processing logic determines that the first total overhead time value is greater than the second total overhead time value, and then determines a difference between the first total overhead time value and the second total overhead time value.

At block 340, responsive to determining that the difference exceeds the assigned execution time, the processing logic causes a run of the first virtual machine to be repeated before running any other virtual machine of the plurality of virtual machines. Responsive to causing the run of the first virtual machine to be repeated, the processing logic sets the value of the first total overhead time to zero. Depending on the embodiment, the processing logic sets the first total overhead time and the second total overhead to zero.

Figure 4A:
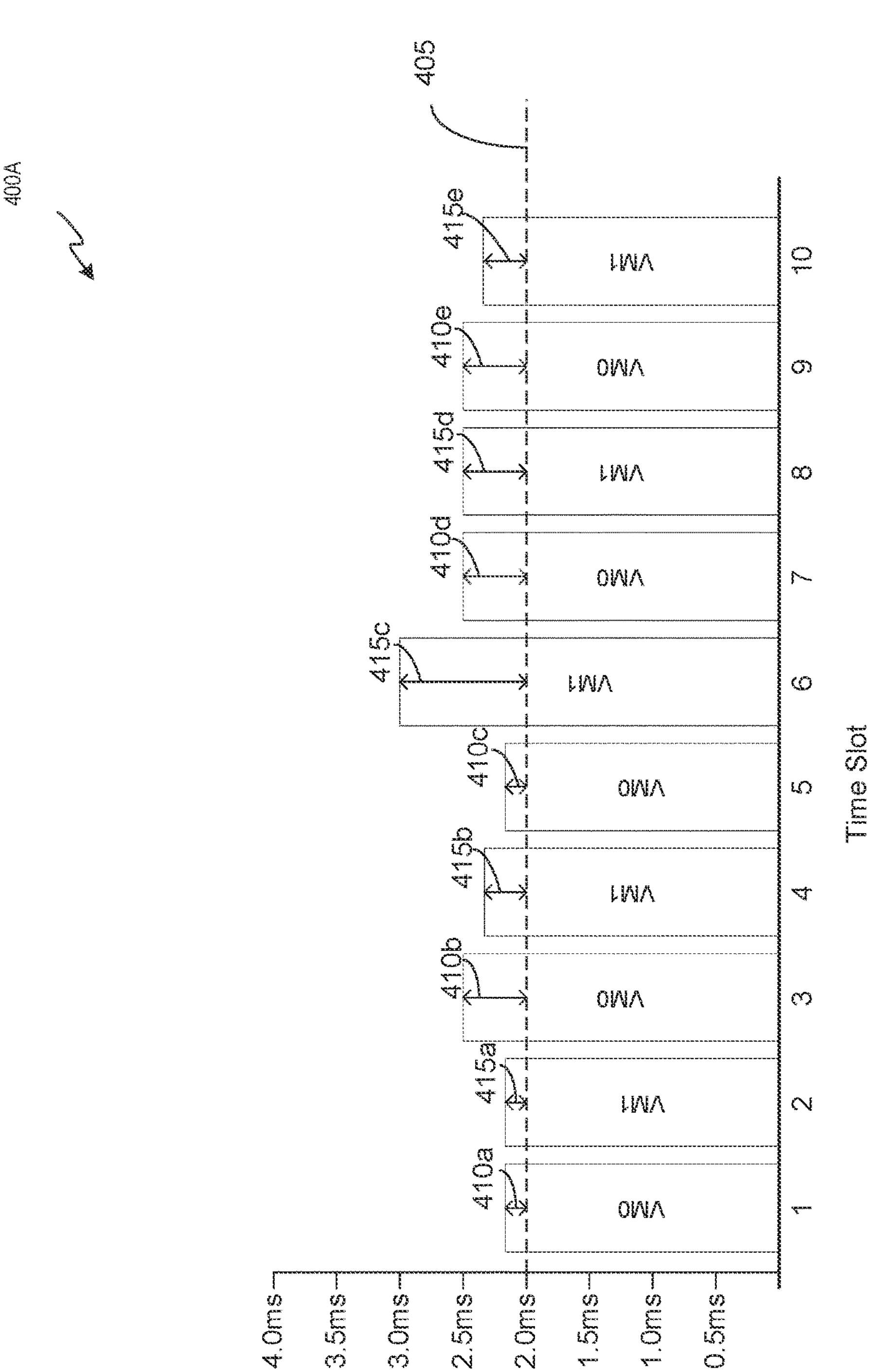
FIG. 4A illustrates an example of scheduling execution of vGPUs associated with virtual machines (VMs) on a graphics processing unit (GPU), in accordance with at least one embodiment.

FIG. 4A is an example of scheduling VMs associated with vGPUs on a GPU without compensation for VM based on preemption overhead, according to at least one embodiment. Graph 400A includes a plurality of virtual machines VMs (e.g., virtual machine 0 (VM0) and virtual machine 1 (VM1)) associated with a vGPU being run on the GPU for a predetermined time slice ("time slice") 405 (e.g., 2 ms) each time slot (e.g., 1-10) in a round-robin fashion.

VM0 runs at time slot 1 for time slice 405, while the scheduler 132 (FIG. 1) determines whether to run a specific VM back to back. When VM0 is running or finishes to run at time slot 1 for the time slice 405, the VM overhead analyzer 125 (of FIG. 1) determines that the VM0 runs for an additional time 410*a* (e.g., 0.165 ms) associated with an overhead of the VM0. As previously described, the overhead is associated with the preemption of the VM, in particular, due to context save and restore and GPU drain. The VM overhead analyzer 125 maintains a running summation of the total overhead associated with VM0 (e.g., the total overhead of VM0) detected by the VM overhead analyzer 125. Accordingly, the total overhead of VM0 includes the additional time 410*a* (e.g., 0.165 ms).

After running VM0 at time slot 1, VM1 runs at time slot 2 for time slice 405. When VM1 is running or finishes to run at time slot 2 for the time slice 405, the VM overhead analyzer 125 determines that VM0 runs for an additional time 415*a* (e.g., 0.165 ms) associated with an overhead of the VM1. The VM overhead analyzer 125 maintains a running summation of the total overhead associated with VM1 (e.g., the total overhead of VM1) detected by the VM overhead analyzer 125. Accordingly, the total overhead of VM1 includes the additional time 415*a* (e.g., 0.165 ms).

Before each run of a subsequent VM (e.g., a next VM), the VM overhead analyzer 125 determines whether an overhead threshold is satisfied. The overhead threshold is satisfied based on initially determining whether the overhead of the previous VM is greater than the total overhead of the next VM. Based on initially determining that the overhead of the previous VM is greater than the total overhead of the next VM, determining whether the difference between the total overhead of the previous VM and the total overhead of the next VM exceeds the time slice 405.

In particular, with respect to graph 400A, time slot 3 is scheduled to run V0, and the VM overhead analyzer 125 determines that the total overhead of VM1 (e.g., 0.165 ms) is not greater than the total overhead of VM0 (e.g., 0.165 ms). Furthermore, since the total overhead of VM1 is not greater than the total overhead of VM0, the difference does not need to be calculated to be compared to the time slice 405. Accordingly, the scheduler 132 does not schedule VM1 to run again at time slot 3 before the scheduled run of VM0. When VM0 is running or finishes to run at time slot 3 for the time slice 405, the VM overhead analyzer 125 determines that VM0 runs for an additional time 410*b* (e.g., 0.165 ms). The VM overhead analyzer 125 adds the additional time 410*b* (e.g., 0.165 ms) to the total overhead of VM0. Accordingly, the total overhead of VM0 (e.g., 0.765 ms) includes the additional time 410*a* (e.g., 0.165 ms) and the additional time 410*b* (e.g., 0.5 ms).

Before running VM1 at time slot 4, the VM overhead analyzer 125 determines whether the overhead threshold is satisfied. The VM overhead analyzer 125 determines that the total overhead of the VM0 (e.g., 0.765 ms) is greater than the total overhead of VM1 (e.g., 0.165 ms), however the difference between the total overhead of the VM0 and the total overhead of VM1 does not exceed the time slice 405 (e.g., 0.5 ms). Accordingly, the scheduler 132 does not schedule VM0 to run again before the scheduled run of VM1 at time slot 4. When VM1 is running or finishes to run at time slot 4 for the time slice 405, the VM overhead analyzer 125 determines that VM1 ran for an additional time 415*b* (e.g., 0.334 ms). The VM overhead analyzer 125 adds the additional time 415*b* (e.g., 0.334 ms) to the total overhead of VM1. Accordingly, the total overhead of VM1 (e.g., 0.5 ms) includes the additional time 415*a* (e.g., 0.165) and the additional time 415*b* (e.g., 0.334 ms).

Before running VM0 at time slot 5, the VM overhead analyzer 125 determines whether the overhead threshold is satisfied. The VM overhead analyzer 125 determines that the total overhead of VM1 (e.g., 0.5 ms) is not greater than the total overhead of VM0 (e.g., 0.765 ms). Accordingly, the scheduler 132 does not schedule VM1 to run again at time slot 5 before the scheduled run of VM0. When VM0 is running or finishes to run at time slot 5 for the time slice 405, the VM overhead analyzer 125 determines that VM0 runs for an additional time 410*c* (e.g., 0.165 ms). The VM overhead analyzer 125 adds the additional time 410*c* (e.g., 0.165 ms) to the total overhead of VM0. Accordingly, the total overhead of VM0 (e.g., 0.83 ms) includes the additional time 410*a-c* (e.g., 0.165 ms, 0.5 ms, and 0.165 ms).

Before running VM1 at time slot 6, the VM overhead analyzer 125 determines whether the overhead threshold is satisfied. The VM overhead analyzer 125 determines that the total overhead of the VM0 (e.g., 0.83 ms) is greater than the total overhead of VM1 (e.g., 0.5 ms), however the difference between the total overhead of the VM0 and the total overhead of VM1 does not exceed the time slice 405 (e.g., 0.334 ms). Accordingly, the scheduler 132 does not schedule VM0 to run again at time slot 6 before the scheduled run of VM1. When VM1 is running or finishes to run at time slot 6 for the time slice 405, the VM overhead analyzer 125 determines that VM1 runs for an additional time 415*c* (e.g., 1 ms). The VM overhead analyzer 125 adds the additional time 415*c* (e.g., 1 ms) to the total overhead of VM1. Accordingly, the total overhead of VM1 (e.g., 1.5 ms) includes the additional time 415*a-c* (e.g., 0.165 ms, 0.334 ms, and 1 ms).

Before running VM0 at time slot 7, the VM overhead analyzer 125 determines whether the overhead threshold is satisfied. The VM overhead analyzer 125 determines that the total overhead of the VM1 (e.g., 1.5 ms) is greater than the total overhead of VM0 (e.g., 0.83 ms), however the difference between the total overhead of the VM1 and the total overhead of VM0 does not exceed the time slice 405. Accordingly, the scheduler 132 does not schedule VM1 to run again at time slot 7 before the scheduled run of VM0. When VM0 is running or finishes to run at time slot 7 for the time slice 405, the VM overhead analyzer 125 determines that VM0 runs for an additional time 410*d* (e.g., 0.5 ms). The VM overhead analyzer 125 adds the additional time 410*d* (e.g., 0.5 ms) to the total overhead of VM0. Accordingly, the total overhead of VM0 (e.g., 1.34 ms) includes the additional time 410*a-d* (e.g., 0.165 ms, 0.5 ms, 0.165 ms, and 0.5 ms).

Before running VM1 at time slot 8, the VM overhead analyzer 125 determines whether the overhead threshold is satisfied. The VM overhead analyzer 125 determines that the total overhead of VM0 (e.g., 1.34 ms) is not greater than the total overhead of the VM1 (e.g., 1.5 ms). Accordingly, the scheduler 132 does not schedule VM0 to run again at time slot 8 before the scheduled run of VM1. When VM1 is running or finishes to run at time slot 8 for the time slice 405, the VM overhead analyzer 125 determines that VM1 runs for an additional time 415*d* (e.g., 0.5 ms). The VM overhead analyzer 125 adds the additional time 415*d* (e.g., 0.5 ms) to the total overhead of VM1. Accordingly, the total overhead of VM1 (e.g., 2.0 ms) includes the additional time 415*a-d* (e.g., 0.165 ms, 0.334 ms, 1 ms, and 0.5 ms).

Before running VM0 at time slot 9, the VM overhead analyzer 125 determines whether the overhead threshold is satisfied. The VM overhead analyzer 125 determines that the total overhead of the VM1 (e.g., 2.0 ms) is greater than the total overhead of VM0 (e.g., 1.34 ms), however the difference between the total overhead of the VM1 and the total overhead of VM0 does not exceed the time slice 405. Accordingly, the scheduler 132 does not schedule VM1 to run again at time slot 9 before the scheduled run of VM0. When VM0 is running or finishes to run at time slot 9 for the time slice 405, the VM overhead analyzer 125 determines that VM0 runs for an additional time 410*e* (e.g., 0.5 ms). The VM overhead analyzer 125 adds the additional time 410*e* (e.g., 0.5 ms) to the total overhead of VM0. Accordingly, the total overhead of VM0 (e.g., 1.84 ms) includes the additional time 410*a-e* (e.g., 0.165 ms, 0.5 ms, 0.165 ms, 0.5 ms, and 0.5 ms).

Before running VM1 at time slot 10, the VM overhead analyzer 125 determines whether the overhead threshold is satisfied. The VM overhead analyzer 125 determines that the total overhead of the VM1 (e.g., 2.0 ms) is greater than the total overhead of VM0 (e.g., 1.84 ms), however the difference between the total overhead of the VM1 and the total overhead of VM0 does not exceed the time slice 405. Accordingly, the scheduler 132 does not schedule VM0 to run again at time slot 10 before the scheduled run of VM1. When VM1 is running or finishes to run at time slot 10 for the time slice 405, the VM overhead analyzer 125 determines that VM1 runs for an additional time 415*e* (e.g., 0.334 ms). The VM overhead analyzer 125 adds the additional time 415*e* (e.g., 0.334 ms) to the total overhead of VM1. Accordingly, the total overhead of VM1 (e.g., 2.334 ms)

includes the additional time 415*a-e* (e.g., 0.165 ms, 0.334 ms, 1 ms, 0.5 ms, and 0.334 ms).

Accordingly, each VM was able to run for their designated time slot (e.g., 1-10) for their allotted time slice (e.g., 2 ms) without interference. In particular, the difference of the total overhead time of VM0 and total overhead time of VM1 and the difference of the total overhead time of VM1 and total overhead time of VM0 never exceeded the time slice (e.g., 2 ms).

Figure 4B:
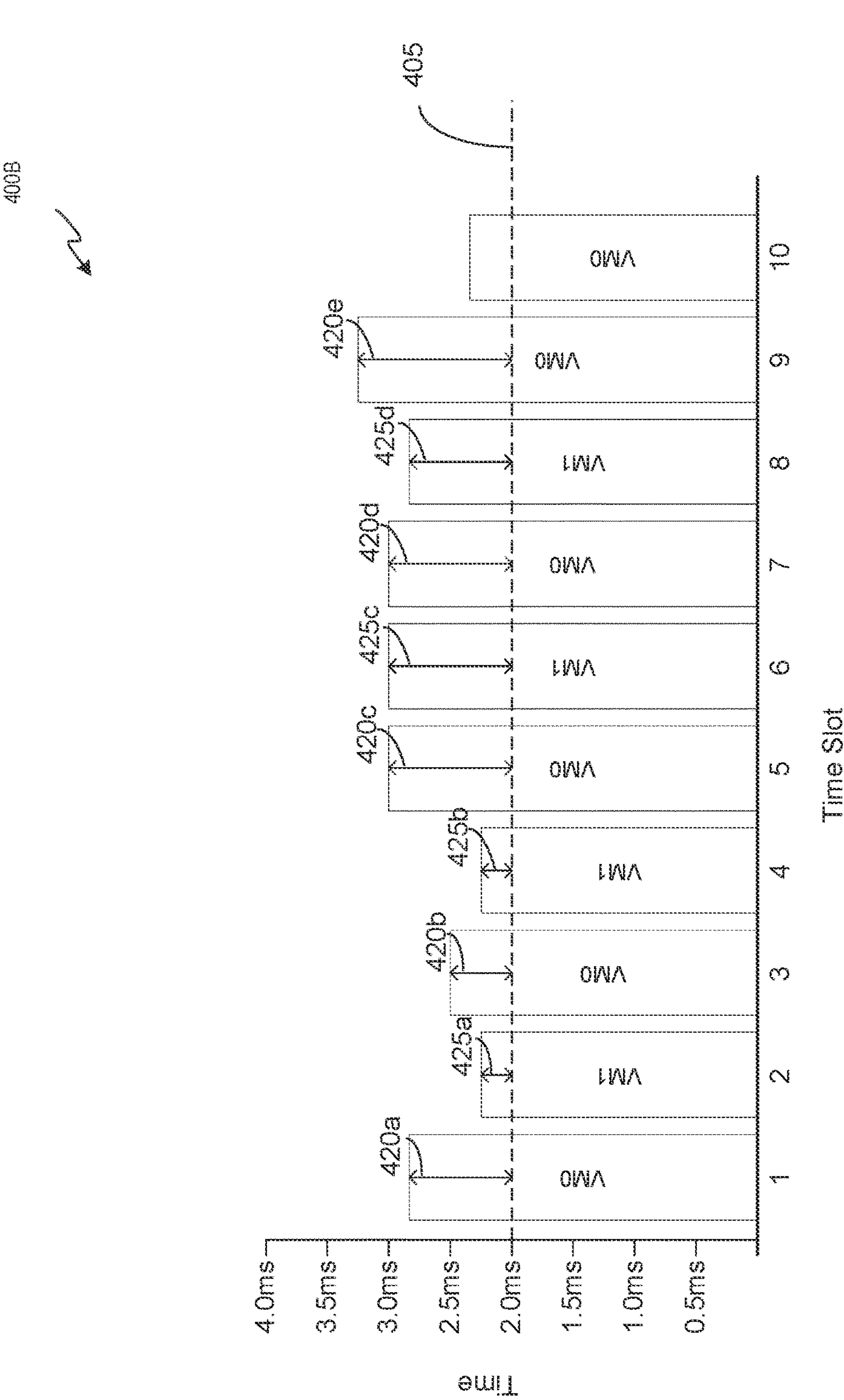
FIG. 4B illustrates an example of scheduling execution of vGPUs associated with VMs on a GPU, in accordance with at least one embodiment.

Referring now to FIG. 4B, another example of scheduling of VMs associated with vGPUs on a GPU with compensation for VM based on preemption overhead, according to at least one embodiment. Graph 400B includes a plurality of virtual machines VMs (e.g., virtual machine 0 (VM0) and virtual machine 1 (VM1) associated with a vGPU being run on the GPU for a predetermined time slice ("time slice") 405 (e.g., 2 ms) each time slot (e.g., 1-10) in a round-robin fashion.

VM0 runs at time slot 1 for time slice 405, while the scheduler 132 (FIG. 1) determines whether to run a specific VM back to back. When VM0 is running or finishes to run at time slot 1 for the time slice 405, the VM overhead analyzer 125 (of FIG. 1) determines that the VM0 runs for an additional time 420*a* (e.g., 0.75 ms) associated with an overhead of the VM0. As previously described, the overhead is associated with the preemption of the VM, in particular, due to context save and restore and GPU drain. The VM overhead analyzer 125 maintains a running summation of the total overhead associated with VM0 (e.g., the total overhead of VM0) detected by the VM overhead analyzer 125. Accordingly, the total overhead of VM0 includes the additional time 420*a* (e.g., 0.75 ms).

After running VM0 at time slot 1, VM1 runs at time slot 2 for time slice 405. When VM1 is running or finishes to run at time slot 2 for the time slice 405, the VM overhead analyzer 125 determines that VM0 runs for an additional time 425*a* (e.g., 0.25 ms) associated with an overhead of the VM1. The VM overhead analyzer 125 maintains a running summation of the total overhead associated with VM1 (e.g., the total overhead of VM1) detected by the VM overhead analyzer 125. Accordingly, the total overhead of VM1 includes the additional time 425*a* (e.g., 0.25 ms).

Before each run of a subsequent VM (e.g., a next VM), the VM overhead analyzer 125 determines whether an overhead threshold is satisfied. The overhead threshold is satisfied based on initially determining whether the overhead of the previous VM is greater than the total overhead of the next VM. Based on initially determining that the overhead of the previous VM is greater than the total overhead of the next VM, determining whether the difference between the total overhead of the previous VM and the total overhead of the next VM exceeds the time slice 405.

In particular, with respect to graph 400B, time slot 3 is scheduled to run VM0, and the VM overhead analyzer 125 determines whether the overhead threshold is satisfied. The VM overhead analyzer 125 determines that the total overhead of VM1 (e.g., 0.25 ms) is not greater than the total overhead of the VM0 (e.g., 0.75 ms). Accordingly, the scheduler 132 does not schedule VM1 to run again at time slot 3 before the scheduled run of VM0. When VM0 is running or finishes to run at time slot 3 for the time slice 405, the VM overhead analyzer 125 determines that VM0 runs for an additional time 420*b* (e.g., 0.5 ms). The VM overhead analyzer 125 adds the additional time 420*b* (e.g., 0.5 ms) to the total overhead of VM0. Accordingly, the total overhead of VM0 (e.g., 1.25 ms) includes the additional time 420*a* (e.g., 0.75 ms) and the additional time 420*b* (e.g., 0.5 ms).

Before running VM1 at time slot 4, the VM overhead analyzer 125 determines whether the overhead threshold is satisfied. The VM overhead analyzer 125 determines that the total overhead of the VM0 (e.g., 1.25 ms) is greater than the total overhead of VM1 (e.g., 0.25), however the difference between the total overhead of the VM0 and the total overhead of VM1 does not exceed the time slice 405. Accordingly, the scheduler 132 does not schedule VM0 to run again at time slot 4 before the scheduled run of VM1. When VM1 is running or finishes to run at time slot 4 for the time slice 405, the VM overhead analyzer 125 determines that VM1 runs for an additional time 425*b* (e.g., 0.25 ms). The VM overhead analyzer 125 adds the additional time 425*b* (e.g., 0.25 ms) to the total overhead of VM1. Accordingly, the total overhead of VM1 (e.g., 0.5 ms) includes the additional time 425*a* (e.g., 0.25 ms) and the additional time 425*b* (e.g., 0.25 ms).

Before running VM0 at time slot 5, the VM overhead analyzer 125 determines whether the overhead threshold is satisfied. The VM overhead analyzer 125 determines that the total overhead of VM1 (e.g., 0.5 ms) is not greater than the total overhead of VM0 (e.g., 1.25 ms). Accordingly, the scheduler 132 does not schedule VM1 to run again at time slot 5 before the scheduled run of VM0. When VM0 is running or finishes to run at time slot 5 for the time slice 405, the VM overhead analyzer 125 determines that VM0 runs for an additional time 420*c* (e.g., 1.0 ms). The VM overhead analyzer 125 adds the additional time 420*c* (e.g., 1.0 ms) to the total overhead of VM0. Accordingly, the total overhead of VM0 (e.g., 2.25 ms) includes the additional time 420*a-c* (e.g., 0.75 ms, 0.5 ms, and 1.0 ms).

Before running VM1 at time slot 6, the VM overhead analyzer 125 determines whether the overhead threshold is satisfied. The VM overhead analyzer 125 determines that the total overhead of the VM0 (e.g., 2.25 ms) is greater than the total overhead of VM1 (e.g., 0.5 ms), however the difference between the total overhead of the VM0 and the total overhead of VM1 does not exceed the time slice 405. Accordingly, the scheduler 132 does not schedule VM0 to run again at time slot 6 before the scheduled run of VM1. When VM1 is running or finishes to run at time slot 6 for the time slice 405, the VM overhead analyzer 125 determines that VM1 runs for an additional time 425*c* (e.g., 1.0 ms). The VM overhead analyzer 125 adds the additional time 425*c* (e.g., 1.0 ms) to the total overhead of VM1. Accordingly, the total overhead of VM1 (e.g., 1.5 ms) includes the additional time 425*a-c* (e.g., 0.25 ms, 0.25 ms, and 1.0 ms).

Before running VM0 at time slot 7, the VM overhead analyzer 125 determines whether the overhead threshold is satisfied. The VM overhead analyzer 125 determines that the total overhead of VM1 (e.g., 1.5 ms) is not greater than the total overhead of VM0 (e.g., 2.25 ms). Accordingly, the scheduler 132 does not schedule VM1 to run again at time slot 7 before the scheduled run of VM0. When VM0 is running or finishes to run at time slot 7 for the time slice 405, the VM overhead analyzer 125 determines that VM0 runs for an additional time 420*d* (e.g., 1.0 ms). The VM overhead analyzer 125 adds the additional time 420*d* (e.g., 1.0 ms) to the total overhead of VM0. Accordingly, the total overhead of VM0 (e.g., 3.25 ms) includes the additional time 420*a-d* (e.g., 0.75 ms, 0.5 ms, 1.0 ms, and 1.0 ms).

Before running VM1 at time slot 8, the VM overhead analyzer 125 determines whether the overhead threshold is satisfied. The VM overhead analyzer 125 determines that the total overhead of the VM0 (e.g., 3.25 ms) is greater than the total overhead of VM1 (e.g., 1.5 ms), however the difference between the total overhead of the VM0 and the total overhead of VM1 does not exceed the time slice 405. Accordingly, the scheduler 132 does not schedule VM0 to run again at time slot 8 before the scheduled run of VM1. When VM1 is running or finishes to run at time slot 8 for the time slice 405, the VM overhead analyzer 125 determines that VM1 runs for an additional time 425*d* (e.g., 0.75 ms). The VM overhead analyzer 125 adds the additional time 425*d* (e.g., 0.75 ms) to the total overhead of VM1. Accordingly, the total overhead of VM1 (e.g., 2.25 ms) includes the additional time 420*a-d* (e.g., 0.25 ms, 0.25 ms, 1.0 ms, and 0.75 ms).

Before running VM0 at time slot 9, the VM overhead analyzer 125 determines whether the overhead threshold is satisfied. The VM overhead analyzer 125 determines that the total overhead of VM1 (e.g., 2.25 ms) is not greater than the total overhead of VM0 (e.g., 3.25 ms). Accordingly, the scheduler 132 does not schedule VM1 to run again at time slot 9 before the scheduled to run VM0. When VM0 is running or finishes to run at time slot 9 for the time slice 405, the VM overhead analyzer 125 determines that VM0 runs for an additional time 420*e* (e.g., 1.5 ms). The VM overhead analyzer 125 adds the additional time 420*e* (e.g., 1.5 ms) to the total overhead of VM0. Accordingly, the total overhead of VM0 (e.g., 4.75 ms) includes the additional time 420*a-e* (e.g., 0.75 ms, 0.5 ms, 1.0 ms, 1.0 ms, and 1.5 ms).

Before running VM1 at time slot 10, the VM overhead analyzer 125 determines whether the overhead threshold is satisfied. The VM overhead analyzer 125 determines that the total overhead of the VM0 (e.g., 4.75 ms) is greater than the total overhead of VM1 (e.g., 2.25) and determines that the difference between the total overhead of the VM0 and the total overhead of VM1 exceeds the time slice 405. Accordingly, the VM overhead analyzer causes the scheduler 132 to schedule VM0 to run again at time slot 10 before the scheduled run of VM1.

Figure 5:
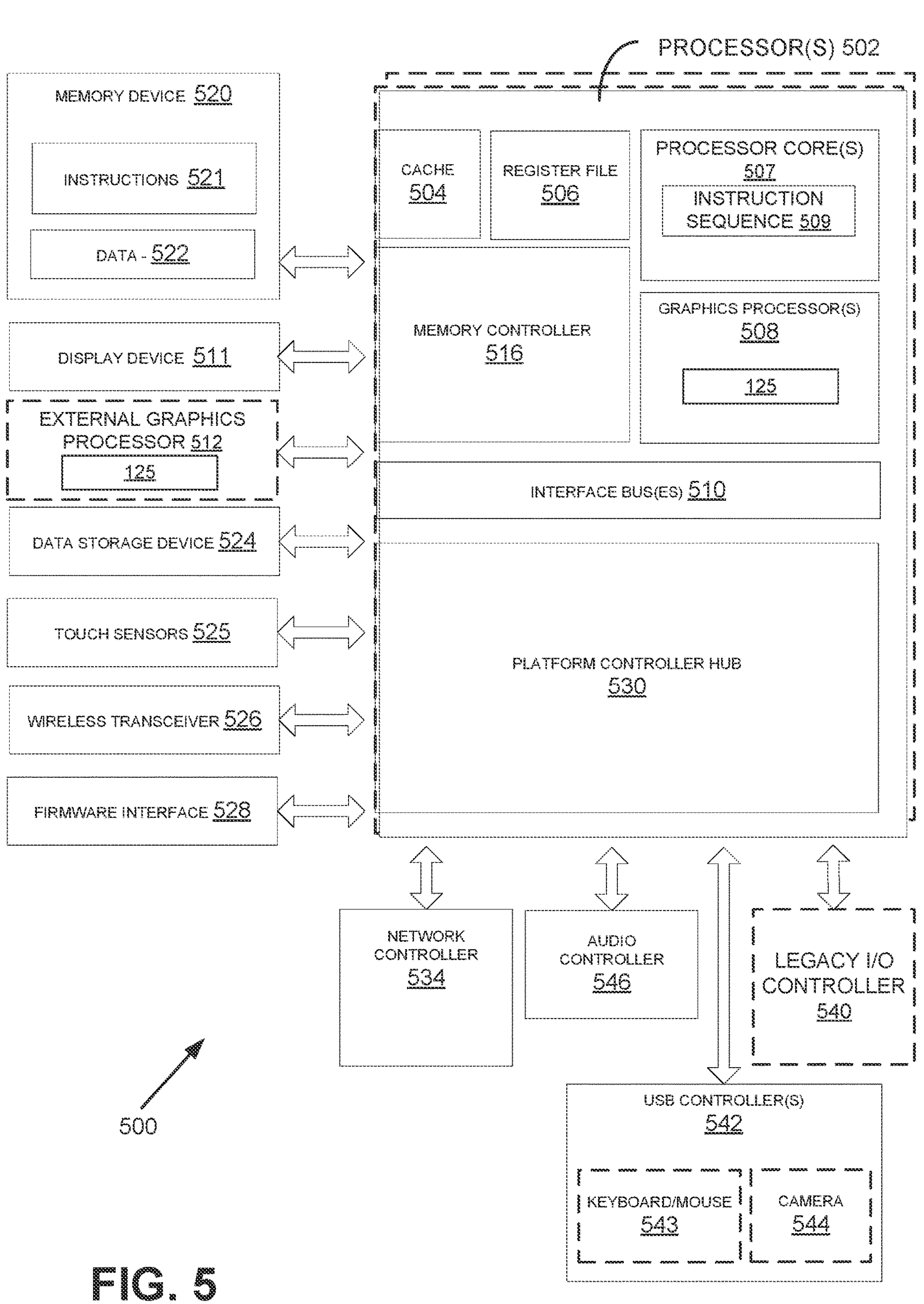
FIG. 5 is a block diagram illustrating a computer system, according to at least one embodiment.

FIG. 5 is a block diagram of a processing system, according to at least one embodiment. In at least one embodiment, system 500 includes one or more processors 502 including one or more graphics processors 508, and may be a single processor desktop system, a multiprocessor workstation system, or a server system having a large number of processors 502 or processor cores 507. In at least one embodiment, system 500 is a processing platform incorporated within a system-on-a-chip (SoC) integrated circuit for use in mobile, handheld, or embedded devices.

In at least one embodiment, system 500 can include, or be incorporated within a server-based gaming platform, a game console, including a game and media console, a mobile gaming console, a handheld game console, or an online game console. In at least one embodiment, system 500 is a mobile phone, a smart phone, a tablet computing device or a mobile Internet device. In at least one embodiment, processing system 500 can also include, couple with, or be integrated within a wearable device, such as a smart watch wearable device, a smart eyewear device, an augmented reality device, or a virtual reality device. In at least one embodiment, processing system 500 is a television or set top box device having one or more processors 502 and a graphical interface generated by one or more graphics processors 508.

In at least one embodiment, one or more processors 502 each include one or more processor cores 507 to process instructions which, when executed, perform operations for system and user software. In at least one embodiment, each of one or more processor cores 507 is configured to process a specific instruction sequence 509. In at least one embodiment, instruction sequence 509 may facilitate Complex Instruction Set Computing (CISC), Reduced Instruction Set Computing (RISC), or computing via a Very Long Instruction Word (VLIW). In at least one embodiment, processor cores 507 may each process a different instruction sequence 509, which may include instructions to facilitate emulation of other instruction sequences. In at least one embodiment, processor core 507 may also include other processing devices, such a Digital Signal Processor (DSP).

In at least one embodiment, processor 502 includes a cache memory 504. In at least one embodiment, processor 502 can have a single internal cache or multiple levels of internal cache. In at least one embodiment, cache memory is shared among various components of processor 502. In at least one embodiment, processor 502 also uses an external cache (e.g., a Level-3 (L3) cache or Last Level Cache (LLC)) (not shown), which may be shared among processor cores 507 using known cache coherency techniques. In at least one embodiment, a register file 506 is additionally included in processor 502, which may include different types of registers for storing different types of data (e.g., integer registers, floating point registers, status registers, and an instruction pointer register). In at least one embodiment, register file 506 may include general-purpose registers or other registers.

In at least one embodiment, one or more processor(s) 502 are coupled with one or more interface bus(es) 510 to transmit communication signals such as address, data, or control signals between processor 502 and other components in system 500. In at least one embodiment, interface bus 510 can be a processor bus, such as a version of a Direct Media Interface (DMI) bus. In at least one embodiment, interface bus 510 is not limited to a DMI bus, and may include one or more Peripheral Component Interconnect buses (e.g., PCI, PCI Express), memory busses, or other types of interface busses. In at least one embodiment processor(s) 502 include an integrated memory controller 516 and a platform controller hub 530. In at least one embodiment, memory controller 516 facilitates communication between a memory device and other components of system 500, while platform controller hub (PCH) 530 provides connections to I/O devices via a local I/O bus.

In at least one embodiment, a memory device 520 can be a dynamic random access memory (DRAM) device, a static random access memory (SRAM) device, flash memory device, phase-change memory device, or some other memory device having suitable performance to serve as process memory. In at least one embodiment, memory device 520 can operate as system memory for system 500, to store data 522 and instructions 521 for use when one or more processors 502 executes an application or process. In at least one embodiment, memory controller 516 also couples with an optional external graphics processor 512, which may communicate with one or more graphics processors 508 in processors 502 to perform graphics and media operations. In at least one embodiment, a display device 511 can connect to processor(s) 502. In at least one embodiment, display device 511 can include one or more of an internal display device, as in a mobile electronic device or a laptop device, or an external display device attached via a display interface (e.g., DisplayPort, etc.). In at least one embodiment, display device 511 can include a head mounted display (HMD) such as a stereoscopic display device for use in virtual reality (VR) applications or augmented reality (AR) applications.

In at least one embodiment, platform controller hub 530 enables peripherals to connect to memory device 520 and processor 502 via a high-speed I/O bus. In at least one embodiment, I/O peripherals include, but are not limited to, an audio controller 546, a network controller 534, a firmware interface 528, a wireless transceiver 526, touch sensors 525, a data storage device 524 (e.g., hard disk drive, flash memory, etc.). In at least one embodiment, data storage device 524 can connect via a storage interface (e.g., SATA) or via a peripheral bus, such as a Peripheral Component Interconnect bus (e.g., PCI, PCI Express). In at least one embodiment, touch sensors 525 can include touch screen sensors, pressure sensors, or fingerprint sensors. In at least one embodiment, wireless transceiver 526 can be a Wi-Fi transceiver, a Bluetooth transceiver, or a mobile network transceiver such as a 3G, 4G, or Long Term Evolution (LTE) transceiver. In at least one embodiment, firmware interface 528 enables communication with system firmware, and can be, for example, a unified extensible firmware interface (UEFI). In at least one embodiment, network controller 534 can enable a network connection to a wired network. In at least one embodiment, a high-performance network controller (not shown) couples with interface bus 510. In at least one embodiment, audio controller 546 is a multi-channel high definition audio controller. In at least one embodiment, system 500 includes an optional legacy I/O controller 540 for coupling legacy (e.g., Personal System 2 (PS/2)) devices to system 500. In at least one embodiment, platform controller hub 530 can also connect to one or more Universal Serial Bus (USB) controllers 542 connect input devices, such as keyboard and mouse 543 combinations, a camera 544, or other USB input devices.

In at least one embodiment, an instance of memory controller 516 and platform controller hub 530 may be integrated into a discreet external graphics processor, such as external graphics processor 512. In at least one embodiment, platform controller hub 530 and/or memory controller 516 may be external to one or more processor(s) 502. For example, in at least one embodiment, system 500 can include an external memory controller 516 and platform controller hub 530, which may be configured as a memory controller hub and peripheral controller hub within a system chipset that is in communication with processor(s) 502.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

identifying, by at least one processing device, a plurality of virtual processing units associated with a physical processing unit, wherein each of the plurality of virtual processing units is associated with a virtual machine of a plurality of virtual machines, each of the plurality of virtual machines being allocated predefined discrete time slices by a hypervisor to execute computing tasks using respective virtual processing units in round-robin order during respective allocated predefined discrete time slices;

obtaining, by the at least one processing device and for a first virtual machine of the plurality of virtual machines, a first overhead time value associated with the first virtual machine during a first predefined discrete time slice using a first virtual processing unit of the plurality of virtual processing units;

obtaining, by the at least one processing device and for a second virtual machine of the plurality of virtual machines, a second overhead time value associated with the second virtual machine during a second predefined discrete time slice using a second virtual processing unit of the plurality of virtual processing units;

determining, by the at least one processing device and based on the first overhead time value associated with the first virtual machine, whether the second overhead time value associated with the second virtual machine satisfies a compensation threshold criterion, wherein the compensation threshold criterion is satisfied if a difference between the second overhead time value associated with the second virtual machine and the first overhead time value associated with the first virtual machine is greater than a respective assigned execution time period of the second virtual machine; and responsive to determining that the second overhead time value associated with the second virtual machine satisfies the compensation threshold criterion, causing, by the at least one processing device, the hypervisor to allocate a third predefined discrete time slice to the second virtual machine after the second predefined discrete time slice based on the difference between the second overhead time value associated with the second virtual machine and the first overhead time value associated with the first virtual machine, wherein causing the hypervisor to allocate the third predefined discrete time slice to the second virtual machine comprises executing at least one additional computing task of the second virtual machine immediately following the second predefined discrete time slice and prior to allocating a predefined discrete time slice to execute any other computing task corresponding to any other virtual machine of the plurality of virtual machines.

2. The method of claim 1, further comprising:

obtaining a third overhead time value associated with the executing of the at least one additional computing task during the third predefined discrete time slice;

upon a next time segment allocated to the first virtual machine on the first virtual processing unit, obtaining a fourth overhead time value associated with executing one or more computing tasks during a next discrete time segment;

calculating, for the first virtual machine, a total overhead time value based on a sum of the first overhead time value and the fourth overhead time value;

calculating, for the second virtual machine, a total overhead time value based on a sum of the second overhead time value and the third overhead time value;

determining whether the total overhead time value of the first virtual machine satisfies the compensation threshold criterion; and responsive to determining that the total overhead time value of the first virtual machine satisfies the compensation threshold criterion, causing an allocation of an additional predefined discrete time slice to the first virtual machine immediately following the next discrete time slice and prior to allocating a predefined discrete time slice to any other of the plurality of virtual machines.

3. The method of claim 2, wherein determining whether the total overhead time value of the first virtual machine satisfies the compensation threshold criterion includes determining whether a difference between the total overhead time value of the first virtual machine and the total overhead time value of the second virtual machine is greater than a respective assigned execution time of the first virtual machine, wherein the compensation threshold criterion is satisfied if the difference between the total overhead time value of the first virtual machine and the total overhead time value of the second virtual machine is greater than the respective assigned execution time of the first virtual machine.

4. The method of claim 1, wherein the first overhead time value includes a time period corresponding to at least one of: context save, context restore, or physical processing unit drain associated with the first virtual machine, and the second overhead time value includes a time period corresponding to at least one of: context save, context restore, or physical processing unit drain associated with the second virtual machine.

5. The method of claim 1, further comprising:

responsive to determining that the second overhead time value associated with the second virtual machine does not satisfy the compensation threshold criterion, causing the allocation of a predefined discrete time slice to another of the plurality of virtual machines in accordance with the round-robin order, wherein the compensation threshold criterion is not satisfied if the difference between the second overhead time value and the first overhead time value is less than a respective assigned execution time period of the second virtual machine.

6. The method of claim 1, further comprising:

responsive to executing the at least one additional computing task of the second virtual machine immediately following the second predefined discrete time slice, setting, by the hypervisor, the second overhead time value to zero, wherein the second overhead time value is maintained by the hypervisor.

7. The method of claim 1, wherein the physical processing unit is a physical graphics processing unit (GPU) and the plurality of virtual processing units is a plurality of virtual graphics processing unit (vGPU).

8. A system comprising:

one or more processing units to:

identify a plurality of virtual processing units associated with a physical processing unit, wherein each of the plurality of virtual processing units is associated with a virtual machine of a plurality of virtual machines that execute one or more processing tasks on respective virtual processing units in round-robin order during respective allocated predefined discrete time slices;

obtain, for a first virtual machine of the plurality of virtual machines, a first overhead time value associated with the first virtual machine using a first virtual processing unit of the plurality of virtual processing units;

obtain, for a second virtual machine of the plurality of virtual machines, a second overhead time value associated with the second virtual machine using a second virtual processing unit of the plurality of virtual processing units;

determine, based on the first overhead time value associated with the first virtual machine, whether the second overhead time value associated with the second virtual machine satisfies a compensation threshold criterion, wherein the compensation threshold criterion is satisfied if a difference between the second overhead time value associated with the second virtual machine and the first overhead time value associated with the first virtual machine is greater than a respective assigned execution time period of the second virtual machine; and responsive to determining that the second overhead time value associated with the second virtual machine satisfies the compensation threshold criterion, cause allocation of another predefined discrete time slice to the second virtual machine after a previous predefined discrete time slice of the second virtual machine based on the difference between the second overhead time value associated with the second virtual machine and the first overhead time value associated with the first virtual machine prior to allocating a predefined discrete time slice to any other of the plurality of virtual machines.

9. The system of claim 8, wherein the one or more processing units further to:

obtain a third overhead time value associated with the allocation of another predefined discrete time slice to the second virtual machine;

upon a next allocation of a time slice to the first virtual machine on the first virtual processing unit, obtain a fourth overhead time value associated with the next allocation of the first virtual machine;

calculate, for the first virtual machine, a total overhead time value based on a sum of the first overhead time value and the fourth overhead time value;

calculate, for the second virtual machine, a total overhead time value based on a sum of the second overhead time value and the third overhead time value;

determine whether the total overhead time value of the first virtual machine satisfies the compensation threshold criterion; and responsive to determining that the total overhead time value of the first virtual machine satisfies the compensation threshold criterion, cause an additional allocation of a time slice to the first virtual machine immediately following the next allocation and prior to allocating a time slice to any other of the plurality of virtual machines.

10. The system of claim 9, wherein to determine whether the total overhead time value of the first virtual machine satisfies the compensation threshold criterion, the one or more processing units further to determine whether a difference between the total overhead time value of the first virtual machine and the total overhead time value of the second virtual machine is greater than a respective assigned execution time of the first virtual machine, wherein the compensation threshold criterion is satisfied if the difference between the total overhead time value of the first virtual machine and the total overhead time value of the second virtual machine is greater than the respective assigned execution time of the first virtual machine.

11. The system of claim 8, wherein the first overhead time value includes a time period corresponding to at least one of: context save, context restore, or physical processing unit drain associated with the first virtual machine, and the second overhead time value includes a time period corresponding to at least one of: context save, context restore, or physical processing unit drain associated with the second virtual machine.

12. The system of claim 8, wherein the one or more processing units further to:

responsive to determining that the second overhead time value associated with the second virtual machine does not satisfy the compensation threshold criterion, cause the allocation of a time slice to another of the plurality of virtual machines in accordance with round-robin order, wherein the compensation threshold criterion is not satisfied if the difference between the second overhead time value and the first overhead time value is less than a respective assigned execution time period of the second virtual machine.

13. The system of claim 8, wherein the one or more processing units further to:

responsive to causing the allocation of another predefined discrete time slice to the second virtual machine, set, by a hypervisor, the second overhead time value to zero, wherein the second overhead time value is maintained by the hypervisor.

14. The system of claim 8, wherein the physical processing unit is a physical graphics processing unit (GPU) and the plurality of virtual processing units is a plurality of virtual graphics processing unit (vGPU).

15. A non-transitory computer-readable storage medium comprising instructions that, when executed by a processing device, cause the processing device to perform operations comprising:

for each run of a first virtual machine of a plurality of virtual machines on a first virtual processing unit of a plurality of virtual processing units associated with a physical processing unit for an assigned predefined execution time, adding, by a hypervisor an overhead time value associated with a respective run to a first total overhead time value maintained by the hypervisor for the first virtual machine;

for each run of a second virtual machine of the plurality of virtual machines on a second virtual processing unit of the plurality of virtual processing units associated with the physical processing unit for the assigned predefined execution time, adding, by the hypervisor, an overhead time value associated with a respective run to a second total overhead time value maintained by the hypervisor for the second virtual machine;

prior to a run of a next virtual machine, determine a difference between the first total overhead time value for the first virtual machine and the second total overhead time value for the second virtual machine;

responsive to determining that the difference exceeds the assigned predefined execution time, causing a run of the first virtual machine to be repeated prior to running the next virtual machine by allocating the assigned predefined execution time to the first virtual machine after the assigned predefined execution time of a previous run of the first virtual machine based on the difference between the first total overhead time value for the first virtual machine and the second total overhead time value for the second virtual machine.

16. The non-transitory computer-readable storage medium of claim 15, wherein the first total overhead time value includes a time period of at least one of: context save, context restore, or GPU drain associated with the first virtual machine, and wherein the second total overhead time value includes a time period of a time period of at least one of: context save, context restore, or GPU drain associated with the second virtual machine.

17. The non-transitory computer-readable storage medium of claim 15, wherein responsive to causing the run of the first virtual machine to be repeated, setting, by the hypervisor, the value of the first total overhead time value to zero, wherein the first total overhead time value is maintained by the hypervisor.

18. The non-transitory computer-readable storage medium of claim 15, wherein the physical processing unit is a physical graphics processing unit (GPU) and the plurality of virtual processing units is a plurality of virtual graphics processing unit (vGPU).

* * * * *